United States Patent [19]

Baer et al.

[11] 4,342,454
[45] Aug. 3, 1982

[54] METHOD AND APPARATUS FOR INSTANT REPLAY AND OTHER CAPABILITIES FOR MICROPROCESSOR-CONTROLLED VIDEO GAMES

[75] Inventors: Ralph H. Baer, Manchester; Leonard D. Cope, Merrimack; Thomas J. Mortimer, Amherst, all of N.H.

[73] Assignee: Sanders Associates, Inc., Nashua, N.H.

[21] Appl. No.: 1,806

[22] Filed: Jan. 8, 1979

[51] Int. Cl.³ .............................................. A63F 9/22
[52] U.S. Cl. .................................. 273/85 G; 273/94; 273/DIG. 28; 340/726
[58] Field of Search .................. 273/1 E, 85 G, 86 R, 273/86 B, 313, 237, DIG. 28; 358/93; 340/323 R, 723–725, 726; 360/10

[56] References Cited

U.S. PATENT DOCUMENTS

| | | | |
|---|---|---|---|
| 3,614,766 | 10/1971 | Kievit | 340/726 |
| 3,653,027 | 3/1972 | Scheer | 340/726 |
| 4,017,072 | 4/1977 | Kurtz | 273/DIG. 28 |
| 4,019,745 | 4/1977 | Mustelier | 273/237 |
| 4,026,555 | 5/1977 | Kirschner | 273/85 G |
| 4,082,285 | 4/1978 | Bathurst | 273/237 |
| 4,126,851 | 11/1978 | Okor | 273/237 |
| 4,148,014 | 4/1979 | Burson | 340/724 X |
| 4,156,928 | 5/1979 | Inose et al. | 273/237 |
| 4,163,993 | 8/1979 | Ravizza | 360/10 |
| 4,165,521 | 8/1979 | Watanabe | 340/726 |
| 4,181,308 | 1/1980 | Fox et al. | 273/138 A X |
| 4,197,590 | 4/1980 | Sukonick et al. | 340/726 |
| 4,200,869 | 4/1980 | Murayama et al. | 340/726 |

FOREIGN PATENT DOCUMENTS 1437795  6/1976  United Kingdom ................. 358/93

OTHER PUBLICATIONS

*Popular Electronics*, "Build the Pixie Graphic Display", Jul. 1977, pp. 41–46.
*Scientific American*, Sep. 1977, pp. 16–17.
*Gametronics Proceedings*, "The Trazor TM –A New Input Device", Jan. 1977, pp. 115–120.

*Primary Examiner*—Vance Y. Hum
*Attorney, Agent, or Firm*—Louis Etlinger; Richard I. Seligman

[57] ABSTRACT

Instant replay for microprocessor-controlled video games is provided by storing and retaining for a period of time in a random access memory the results of microprocessor polling of each of the player command entry devices. In a memory conserving embodiment only newly entered player commands and the times when such commands are entered need be stored and retained.

13 Claims, 7 Drawing Figures

METHOD AND APPARATUS FOR INSTANT REPLAY AND OTHER CAPABILITIES FOR MICROPROCESSOR-CONTROLLED VIDEO GAMES

BACKGROUND OF THE INVENTION

This invention relates to video games and more particularly to means for providing an instant replay capability for microprocessor-controlled video games.

U.S. Pat. Nos. Re. 28,507, Re. 28,598, and 4,026,555 describe systems which are used in conjunction with raster scan displays, such as, broadcast television receivers to play games. These systems include electrical circuitry and components for generating signals which, when applied to a raster scan display, will cause the display to show on the screen thereof game playing indicia or symbols representing such things as simulated players, balls, fields, and the like. Operator controls are provided which, among other things, permit the players or participants to cause movement of certain ones of the symbols about the screen of the raster scan display to play games. The latter of the aforementioned patents is directed to a particular implementation of video games wherein a miroprocessor is employed and wherein action or movement commands for the players on the screen of the raster scan display are entered by pushbuttons which command a simulated player to move, for example, up, down, left or right.

To provide such video games which are more imitative of the real life contests which are broadcast and displayed on a television receiver it is desired to provide an instant replay capability. This capability derives its genesis from the experience that television sports program viewers enjoy that medium's ability to "roll back time" through the use of instant replay techniques so as to allow the quick review of seconds' worth of events, such as, an interesting or controversial play just completed. As microprocessor-controlled video games become available which play games that succeed in emulating real life contests more and more accurately, it becomes similarly desirable to provide such an instant replay capability. Availability of "freeze frame" or "still" picture representation would further add to the enjoyment of such games.

In the television broadcast of real life contests the instant replay of moving or still television images has generally been accomplished by video taping the game or other event in real time and then playing back 10, 20, or 30 seconds of this tape for "instant review." Similarly the freeze frame (tape stands still) feature, which is part of a video tape or disc playback system, has been used in the over-the-air or home video presentation. Slow motion provides a slightly more complex problem in that it requires the recorded video tape or disc to employ special means for repeating each frame N times, wherein N is the factor by which "real time" is desired to be slowed down during replay.

To provide instant replay capability for video games in the manner of a real life contest is impractical since it would require the availability of a video tape or disc system in the home where such games are generally played, and unless already available in the home, would be a costly addition.

SUMMARY OF THE INVENTION

Accordingly, it is an object of this invention to extend the scope of video type game playing apparatus and method.

It is another object of this invention to extend the scope of video type game playing apparatus by providing an instant replay capability thereto.

It is a further object of this invention to provide an instant replay capability for video games which is efficient in the use of memory.

It is yet another object of this invention to provide freeze frame and slow motion capability for video games.

Since in a microprocessor-controlled video game, the rules of the game and other information is already available in the stored program of the game, in order to provide a replay of certain of the actions of a particular game, the only information required is that which is inputted by the players or participants. If the commands inputted by the players are repeated, both in kind and in real time, then that portion of the game will be replayed in the same fashion in response to the repeated commands just as it was originally executed.

In a typical microprocessor-controlled video game, the player commands would be entered by, for example, each of the players having a multiple position switch or multiple pushbuttons each of which provides a different directional command, such as, up, up and diagonally to the right, right, down and diagonally to the right, down, down, and diagonally to the left, left, up and diagonally to the left and stop for nine-position device. If these commands, as executed by a participant, are stored for a period of time, then recent events of the game can be replayed by removing the participant commands from said storage at the proper real-time moments and re-executing the play of the game according to these commands.

It has been found that to provide accurate execution of the commands from the player switches, the command origination must be typically recorded to within 0.05 seconds, that is, the microprocessor must sample the switches at least 20 times per second. It has also been found that on the average switch positions are changed as rapidly as once per second. Accordingly, if 30 seconds of instant replay is desired, the miroprocessor must take 600 samples during the 30-second period. For command entering devices comprising 9 positions, 4 bits of data are required to identify which of the 9 positions has been actuated. In the usual game there are at least a set of command entering devices for each player, and each device position would be represented by 4 bits of data. Therefore, to store a full 30-second interval of commands requires 600×9 or 5400 bits of information. This information is stored in a random access memory (RAM). While such an arrangement adequately provides an instant replay capability, it is considered very inefficient in RAM usage in that a minimum of 5400 bits of RAM must be dedicated merely for the storing of player commands for the instant playback capability. If the game has other player command devices such as a keyboard to command other events such as a play in a football game, then even more storage is required.

Improved capability is achieved by making efficient use of memory in storing the player/participant commands for the game for the instant replay function. In a relatively simple game having two 9-position command switches, instead of storing the status of each of the player-controlled command switches every time the microprocessor samples the switch position, what is stored instead is only new or changed switch positions. For example, if the first sampling by the microprocessor of a player's switch position is "up," the 4-bit word representing "up" is stored in memory. If, on the next sampling of the switch position by the microprocessor the switch is still in the "up" position, it is not necessary to store this information, and no additional information regarding switch position is stored until it is changed. For example, if on the 35th sampling of the switch position, the position has now been changed to "right", then the 4-bit data word representing this switch position is stored in memory. So, in the first 35 samplings by the microprocessor, instead of storing 35 data words representing the switch positions, only 2 data words representing the switch positions are stored.

Because each sampling has not necessarily resulted in a stored switch position, it is necessary to also store for each data word entered into memory the time when such new switch position was stored. Therefore, a real time clock is provided which repeats itself for an interval equivalent to the interval of the instant replay. In the example presented, if a replay time of 30 seconds is desired, the real time clock would count in 50 millisecond intervals, that is, in the intervals at the rate of the sampling of the switch positions by the miroprocessor such that in a 30-second time period 600 discrete numbers would be available. The output from this real time clock is a digital word representing elapsed time since the start-of-clock, which is stored in the memory along with the updated switch position. Thus, stored in the instant replay memory would be each new command for a 30-second interval as well as the time during that 30-second interval when the command was executed and subsequently stored.

In the example mentioned above, if the first command occurred at the first sampling by the microprocessor, then in the instant replay memory there would be stored data corresponding to the command of "up" and the time from the real time clock, or time 1. The second amount of information stored in the instant replay memory would be the command position executed at the 35th sampling by the microprocessor or "right." Accordingly, the data word corresponding to the switch position "right" would be stored as well as the time 35. Once a 30-second interval is completed, new participant command update information would begin replacing the oldest memory data such that the instant replay memory would always contain the most recent 30 seconds of replay information.

In this system, if we assume the commands are changed on the average of once per second, then 30 command switch changes would be stored in a 30 second interval. Each sample consists of 2×4 bits=8 bits of data per position, as there are two command switches, one for each player. Thus, 8×30 or 240 bits of data would need to be stored in the instant replay memory. Additionally, the time of such sample must be stored. Since the microprocessor polls the switch positions every 50 milliseconds, 30 divided by 0.05, or 600 discrete time periods are involved. Ten bits of data are required to represent such 600 time intervals. Hence, the 10 bits for the time and the 8 bits representing the two command switch positions are required per sample or 18 bits per sample. Over a 30-second interval 30×18 or 540 bits of RAM must be dedicated. This is contrasted to the first described system where a switch position is stored for every polling of the switches or 5400 bits of RAM, thus resulting in a considerable saving of memory. This reduction in memory storage required for the instant replay feature as delineated in the second described system is due primarily to the elimination of redundantly stored data (participant commands) of the first described system. Freeze action is accomplished by not permitting a game to progress and instead maintaining the same information on the television screen for a period of time. Slow motion is achieved by repeating each frame a predetermined number of times before moving on to the next frame. Doing this for a number of frames will occasion slow motion action for a desired portion of game play.

BRIEF DESCRIPTION OF THE DRAWINGS

The above-mentioned and other features and objects of this invention will become more apparent by reference to the following description taken in conjunction with the accompanying drawings, in which:

FIG. 3 is a block diagram of a real time clock employed in the microprocessor-controlled video game of FIG. 1;

DESCRIPTION OF PREFERRED EMBODIMENTS

Figure 1:
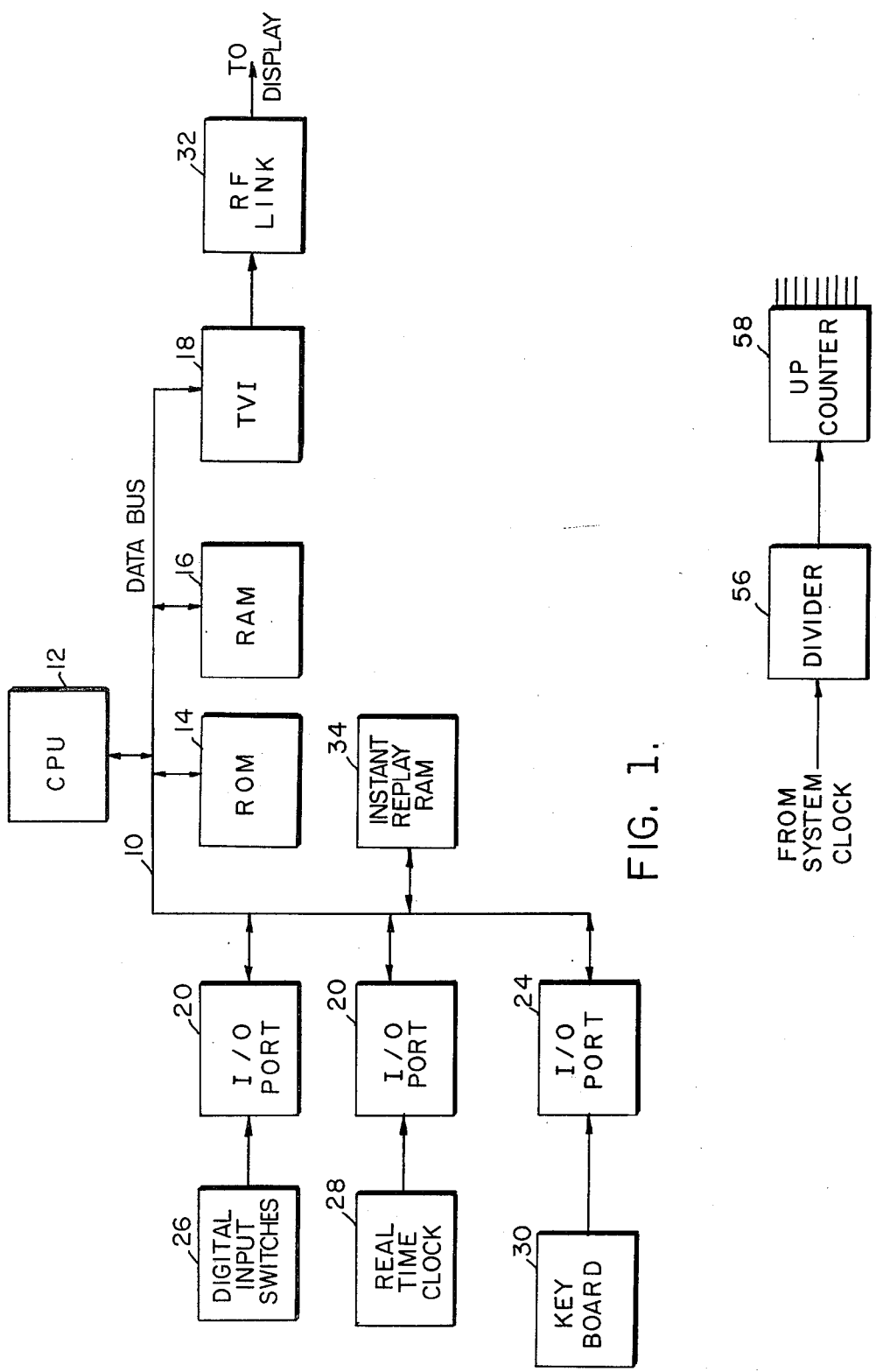
FIG. 1 is a block diagram of a typical microprocessor-controlled video game, including instant replay capability.

Referring now to FIG. 1 of the drawings, there is illustrated thereby a block diagram of a microprocessor-controlled video game including instant replay capability according to the principles of this invention. Most of that represented in FIG. 1 depicts a conventional microprocessor-controlled video game. The system shown comprises a standard computer bus structure including a data bus 10, to which is connected a central processing unit (CPU) 12, a read only memory (ROM) 14, a random access memory (RAM) 16, a television interface (TVI) 18, and various input/output (I/O) ports 20, 22 and 24. These input/output ports allow 2-way communication with such external input devices as participants' or players' digital input switches 26, a real time clock 28, and a keyboard 30.

The TVI supplies its composite video, synchronization signals and color information to an RF modulator-/oscillator subsystem which translates the composite signal into a standard AM modulated television radio frequency signal on a channel frequency compatible with television broadcast or cable receivers. The TV modulator/oscillator subsystem is indicated as RF link 32. Alternatively, instead of modulating the video signal using link 32, the TVI 18 can apply its output directly to a black and white or color TV monitor, which typically accept composite video, synchronization signals and color information without RF modulation. The system of FIG. 1 also includes an instant replay RAM 34 for storing the necessary information to permit instant replay of game action. Alternatively, dedicated portions of RAM 16 may be used in place of RAM 34.

Other than the real time clock 28 and the instant replay RAM 34, the other elements of the system of FIG. 1 are conventional and found in presently available video games. ROM 14 is typically a plug-in unit containing all of the game rules and some of the player symbols peculiar to the particular game to which the plug-in ROM is dedicated. On the other hand, the video game RAM 16 serves as a temporary residence for information extracted in part from ROM 14 and the input/output devices, such as, the switches 26 and keyboard 30, and as a temporary residence for commands to be issued to the data bus 10. TVI 18 accepts data from data bus 10 and reformats it on a TV line-by-line basis into a standard composite video format.

According to certain embodiments of the present invention it is desired to "replay" all of the screen action having occurred after a brief interval, typically 10, 20, or 30 seconds just prior to the end of some on-screen play action, such as, a touchdown in a football game. All of the action viewed on the television screen during this period had its origin in the interaction between commands entered by the participant or player through manipulation of the digital switches 26 and keyboard 30 and the game rules built into the ROM 14, the latter of which are fixed and invariable as long as the same ROM remains in the game. The player commands, on the other hand, are not fixed and hence they must be recorded or stored in a storage medium if the play action is to be repeated.

In accordance with the present invention, the instant replay RAM 34 is connected to the data bus 10 for this purpose of replay. It is used to store the results of the polling by the microprocessor of the status of the digital switches 26 and keyboard 30.

Figure 2:
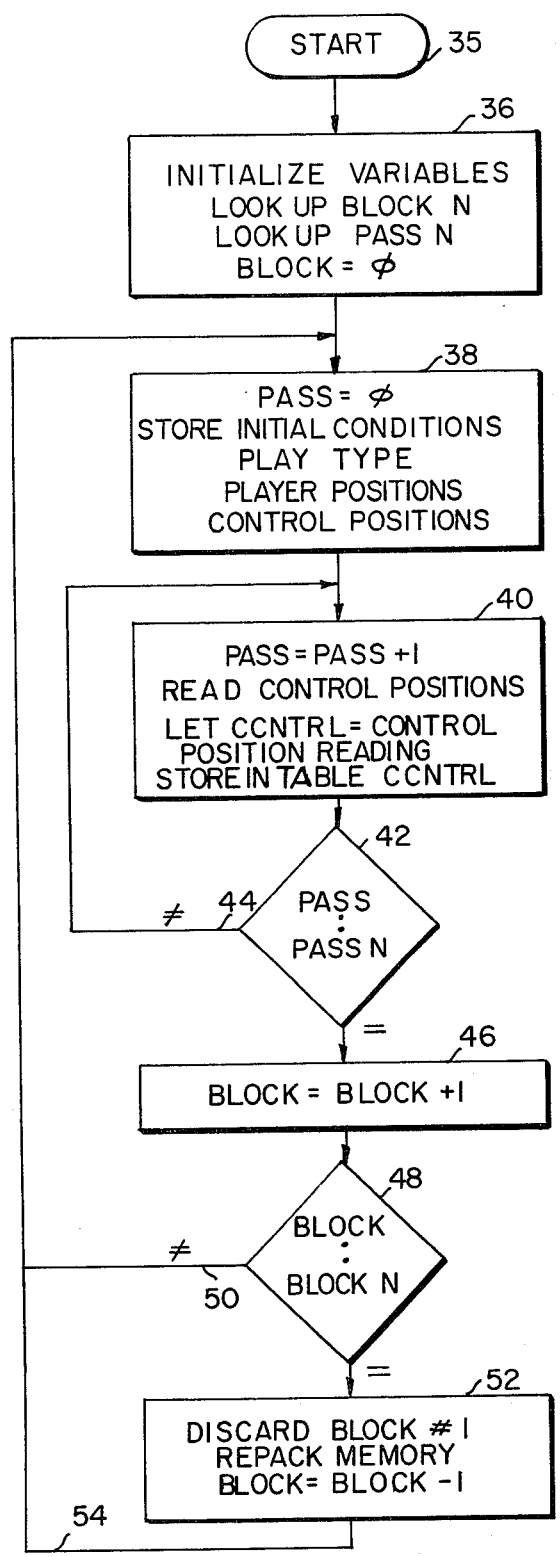
FIG. 2 is a flow chart depicting the extraction and storage of game commands in the instant replay microprocessor-controlled video game of FIG. 1 for providing instant replay capability.

Referring now to FIG. 2, there is illustrated thereby an exemplary flow chart of a controlling program for a first embodiment for providing instant replay capability for the system of FIG. 1 wherein storage is provided for each microprocessor polling interval. The program is stored in the ROM 14 of the microprocessor. Table I below describes the flow chart symbols used in the flow chart of FIG. 2 and the flow charts of FIGS. 4, 6 and 7 to be described hereinafter.

TABLE I

| | Flow Chart Symbols |
|---|---|
| BLOCK | The number of data blocks currently stored in the instant playback RAM. |
| BLOCKN | The number of data blocks for which space has been allocated in the instant playback RAM. |
| CCNTRL | A representation of the current control position settings. |
| CLOCK | The current value of the real time clock. |
| FAS | Freeze action switch reading. |
| FCNT | Field Count; The number of fields that the television display has been repeated. |
| FSL | Frame Start Clock Line reading. |
| OCNTRL | A representation of the previous control position settings. |

TABLE I-continued

| | Flow Chart Symbols |
|---|---|
| | previous control position settings. |
| PASS | The number of times that the control position settings have been interrogated. |
| PASSN | The number of times that the control position settings are to be interrogated in a data block. |
| SMS | Slow Motion Switch reading. |

The program is initiated at step 35 thereof which typically occurs when game play begins. The first step 36 of the program occasions initialization of all the variables. The microprocessor first looks up in ROM 14 Block N, that is, the number of data blocks of information to be stored in the table of the instant replay RAM 34. The second event in the initializing of the variables in step 36 is to look up Pass N. This is the number of control position readings per block of information. Pass N is also stored in the ROM 14. At the end of step 36 Block=0, denoting that no blocks of information are stored in the instant replay RAM 34 at this point in time.

Step 38 is then executed. Pass=0 initially since the keyboard and digital switches have not been as yet interrogated by the microprocessor. Step 38 occasions storage of the present game status. The play type, player positions and control positions are stored. In a typical game, for example, a football game, a pass play may be called for by actuating certain keys of keyboard 30. The data word representing this play is thus stored. The positions (horizontal and vertical coordinates) of the players (two in this example) are stored and the initial control positions are stored.

After storing the initial conditions, the program advances to step 40. In step 40, a 1 is added to the increment of Pass. This increments the internal counter of the machine to remind the microprocessor that it read the keyboard again. This is done in order that the processor should know when it should terminate the building of the data block and begin the construction of a new data block. Thus, each data block will correspond to a fixed number of passes and, hence a fixed interval of time. During playback, to repeat a given interval of time, it is a simple matter to compute the number of data blocks that must be repeated. During step 40 the control positions are read and entered into RAM 34 as CCNTROL.

Step 42 of the program requires a determination as to whether the present value of Pass is equal to Pass N. If not, then via line 44 the program reverts to step 40 to increment the Pass and continue through the steps 40 and 42 until a determination is made that the current Pass equals Pass N and, therefore, that a complete data block for the instant replay RAM has been filled.

When this determination is made, step 46 increments the Block counter by 1.

At step 48, determination is made whether the Block number equals Block N. If not, then via line 50 the program reverts to the beginning of step 38 to fill the next block. If, in step 48, the block number is equal to Block N, then at step 52, Block 1 is discarded from the instant replay RAM and the instant replay RAM memory is repacked. Since the number of blocks desired have been completed, the first block is discarded and the other blocks are shifted. The step also proceeds via line 64 to occasion step 44 to process the next block.

This method of providing instant replay is relatively inefficient in RAM usage and a preferred embodiment of the invention is described. The only commands which are stored in the instant replay RAM for this embodiment are those which represent a change in command.

Conventionally, CPU 12 polls the digital switches 26 and keyboard 30 to determine the switch closures or positions thereof. This polling can occur, for example, every 50 milliseconds. However, in order to use the instant replay RAM efficiently, it is preferred not to store the position of the digital switches and keyboard during each polling or 20 times a second. Instead, it is desired to store the positions of the digital switches and keyboard only when they change. Since this does not occur every 50 milliseconds, but more likely at no less than once a second, much less memory is required for the instant replay RAM 34.

Because the digital switch and keyboard positions are not stored every 50 milliseconds, it is necessary that the time at which a position change occurs be also stored in the instant replay RAM 34. This is the function of the real time clock 28. Clock 28 provides an output which is stored in the instant replay RAM 34 each time there is a storage of a change in the position of the digital switches 26 and keyboard 30. Thus, the instant replay RAM 34 has stored therein real time data from the digital switches along with the time code from the real time clock 28 for each closure during the 10, 20, or 30 second period which the game participant might wish to "recall."

Having stored initial position game parameters, changed positions of the digital switches and keyboard, and the time when the changes occurred, a complete data base is formed from which the game using ROM 14 instructions can reconstruct the action that had occurred during the storage period.

A typical real time clock is illustrated in FIG. 3 of the drawings and comprises a divider 56 which receives an input from the system clock which normally would be part of CPU 12. The output of the divider is pulses at the rate of the CPU polling, in the instance example, pulses at every 50 milliseconds. These pulses are applied to an upcounter 58 so as to provide, for example, for a 30-second replay, 30 divided by 0.05 or 600 counts indicating the time during the 30-second interval when a switch position occurred. An alternate way of generating real-time-clock is by software time interval commands in the game system microprocessor in the conventional fashion.

Accordingly, if the microprocessor is provided with data representing the time when the switch positions occurred and the particular switch position, it can occasion recreation of the action that had occurred during the previous interval. Each block of data represents a complete history of game commands. Instant replay may be initiated from the beginning of any block.

No detailed information is herein disclosed regarding game playing action using the system of FIG. 1 other than instant replay since this is conventional and reference may be had, for example, to the aforementioned U.S. Pat. No. 4,026,555 which is incorporated herein by reference.

Figure 4:
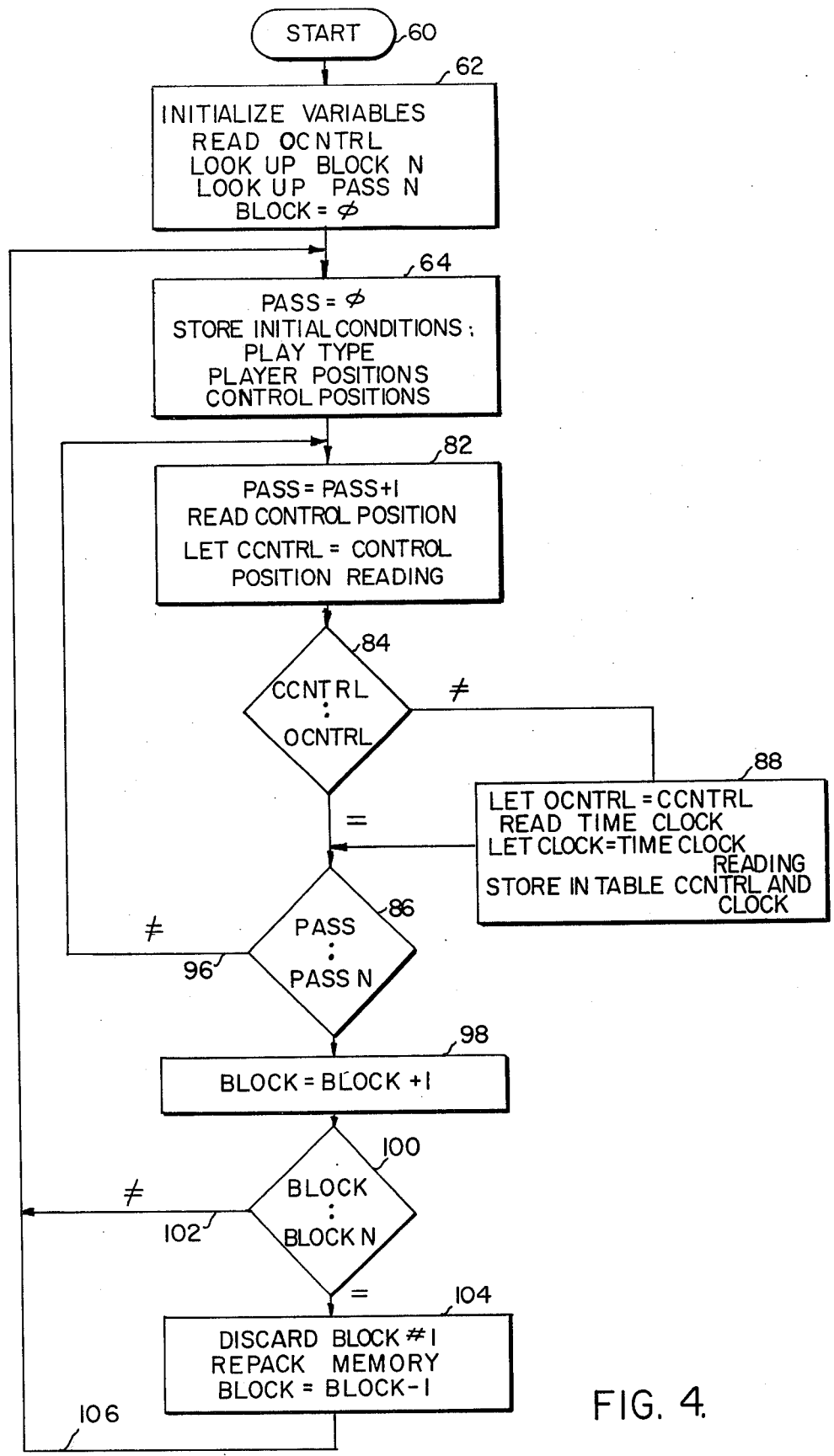
FIG. 4 is a flow chart depicting the extraction and storage of game commands in the instant replay microprocessor-controlled video game of FIG. 1 for providing memory conserving instant replay capability.
Figure 5:
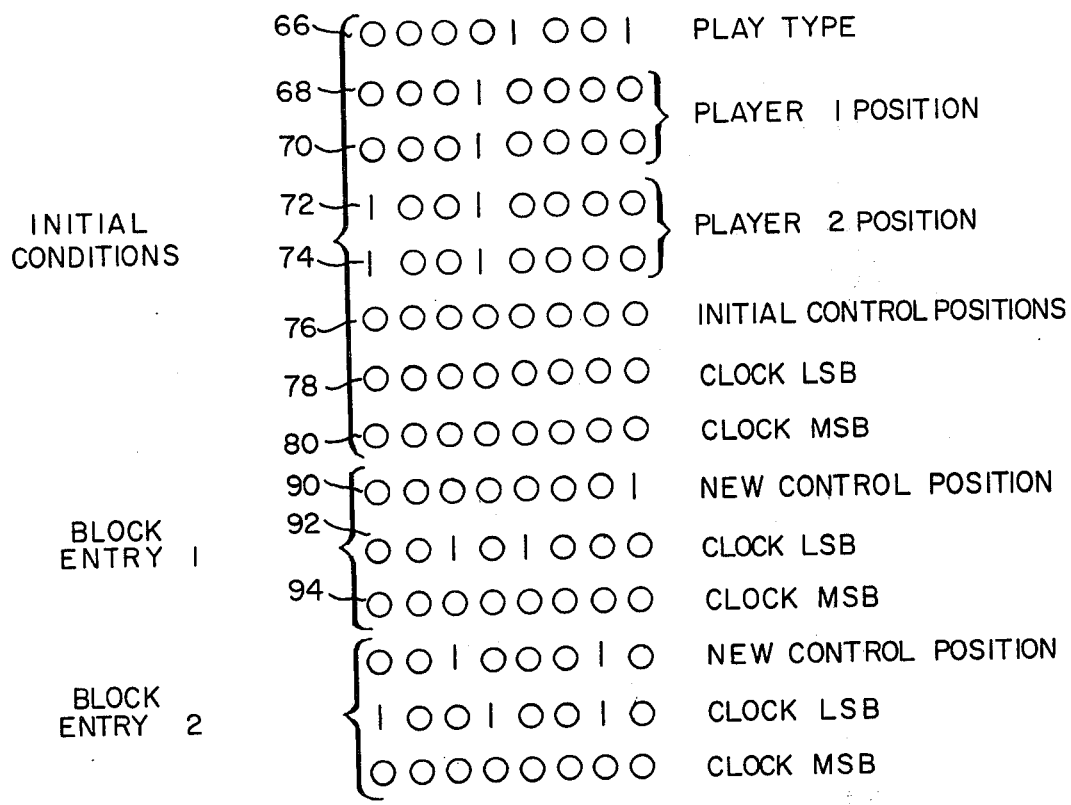
FIG. 5 is a representation of a portion of an instant replay data block used in the system of FIG. 1 with the flow chart of FIG. 4.

Referring now to FIG. 4, there is illustrated thereby the flow chart of a controlling program for the memory conserving instant replay capability of the system of FIG. 1. The program is stored in the ROM 14 of the microprocessor and will be described in conjunction with a typical instant replay data block which is stored in the instant replay RAM 34. A portion of such a data block is illustrated in FIG. 5. The program is initiated at step 60 thereof which typically occurs when game play begins.

The first step 62 of the program occasions initialization of all the variables. The microprocessor first reads OCNTRL. OCNTRL is the position or status of the digital switches 26 and the keyboard 30. This step, thus, provides the initial starting conditions so that when a change in switch or keyboard input is made, this change can be detected. During step 62 the microprocessor also looks up in ROM 14 the parameter Block N, that is, the number of data blocks of information to be stored in the table of the instant replay RAM 34. The third event in the initializing of the variables in step 62 is to look up Pass N. This is the number of control position readings per block of information. Pass N is also stored in the ROM 14. At the end of step 62 Block=0, denoting that no blocks of information are stored in the instant replay RAM 34 at this point in time.

Step 64 is then executed. Pass=0 initially since the keyboard and digital switches have not been interrogated by the microprocessor to determine if any change has occurred. Step 64 occasions storage of the present game status. The play type, player positions and control positions are stored. In a typical game, for example, a football game, a pass play may be called for by actuating certain keys of keyboard 30. The data word representing this play is thus stored. This is indicated by the first line 66 of the instant replay data block illustrated in FIG. 5. The positions (horizontal and vertical coordinates) of the players (two in this example) are shown in the second through fifth lines, lines 68, 70, 72 and 74 of the instant replay data block, and the initial control positions indicated by line 76 of the instant replay data block. Two control position readings are represented by one 8-bit byte since only 4 bits are required to identify a control position. Lastly, the real time clock output, which at the start of a game would be 0 for the least significant bits and most significant bits, is indicated on lines 78 and 80 of the instant replay data block.

After storing the initial conditions, the program advances to step 82. In step 82, a 1 is added to the increment of Pass. This increments the internal counter of the machine to instruct the microprocessor to read the keyboard again. This is done in order that the processor should know when it should terminate the building of the data block and begin the construction of a new data block. Thus, each data block will correspond to a fixed number of passes, and hence a fixed interval. During playback, to repeat a given interval of time, it is a simple matter to compute the number of data blocks that must be repeated. During step 82 the control positions are read and entered into RAM 16 as CCNTRL. Note, that this entry is not part of the instant replay data block, FIG. 5. It is written into the TV game system RAM 16 for use as described below.

In step 84 of the program, CCNTRL is compared with OCNTRL which was stored during step 64. If the position CCNTRL read by the microprocessor is the same as OCNTRL (or the old control positions), the program advances to step 86. If CCNTRL does not equal OCNTRL, then step 88 is executed wherein OCNTRL in the RAM 16 is updated with the new position CCNTRL. During step 88 the real time clock 28 is also read (Clock). CCNTRL and CLOCK are fetched from RAM 16 and stored in RAM 34 as the new command position and the time when such change was made. The new control positions are indicated by line 90 of the instant replay data block of FIG. 5 and the Clock by lines 92 and 94 thereof.

Step 86 of the program requires a determination as to whether the present value of Pass is equal to Pass N. If not, then via line 96 the program reverts to step 82 to increment the Pass and continue through the steps 82, 84, 88 and 86 until a determination is made that the current Pass equals Pass N and, therefore, that a complete data block for the instant replay RAM has been filled.

When this determination is made, step 98 increments the Block counter by 1.

At step 100, a determination is made whether the Block number equals Block N. If not, then via line 102 the program reverts to the beginning of step 64 to fill the next block. If, in step 100, the block number is equal to Block N, then at step 104 Block 1 is discarded from the instant replay RAM and the instant replay RAM memory is repacked. Since the number of blocks desired have been completed, the first block is discarded and the other blocks are shifted. The step also proceeds via line 106 to occasion step 64 to process the next block.

While the foregoing system description details the functional performance of a RAM as the temporary storage medium for CCNTRL and CLOCK data, this function can also be performed by other types of semiconductor memory organization such as serial shift registers. If the latter were used, data would be stored on a FIFO (First-In, First-Out) basis in a manner well known in the art.

The instant replay system of the present invention also lends itself to freeze frame (still picture) displays and slow motion displays. With reference to FIG. 1, it is noted that whenever the data flow from the game microprocessor 12 to the TVI 18 is interrupted, the latter will continue to output its "presently" formatted frame of video signals, i.e., it will cause the CRT to display the same frame—repeated at the normal vertical frame rate, as long as this interruption persists. This is freeze-frame performance. It is implemented by providing a special switch which commands the microprocessor to stop transferring new data to the TVI. In lieu of a special freeze-action switch (FAS) one of the keys on keyboard 30 may be used.

Figure 6:
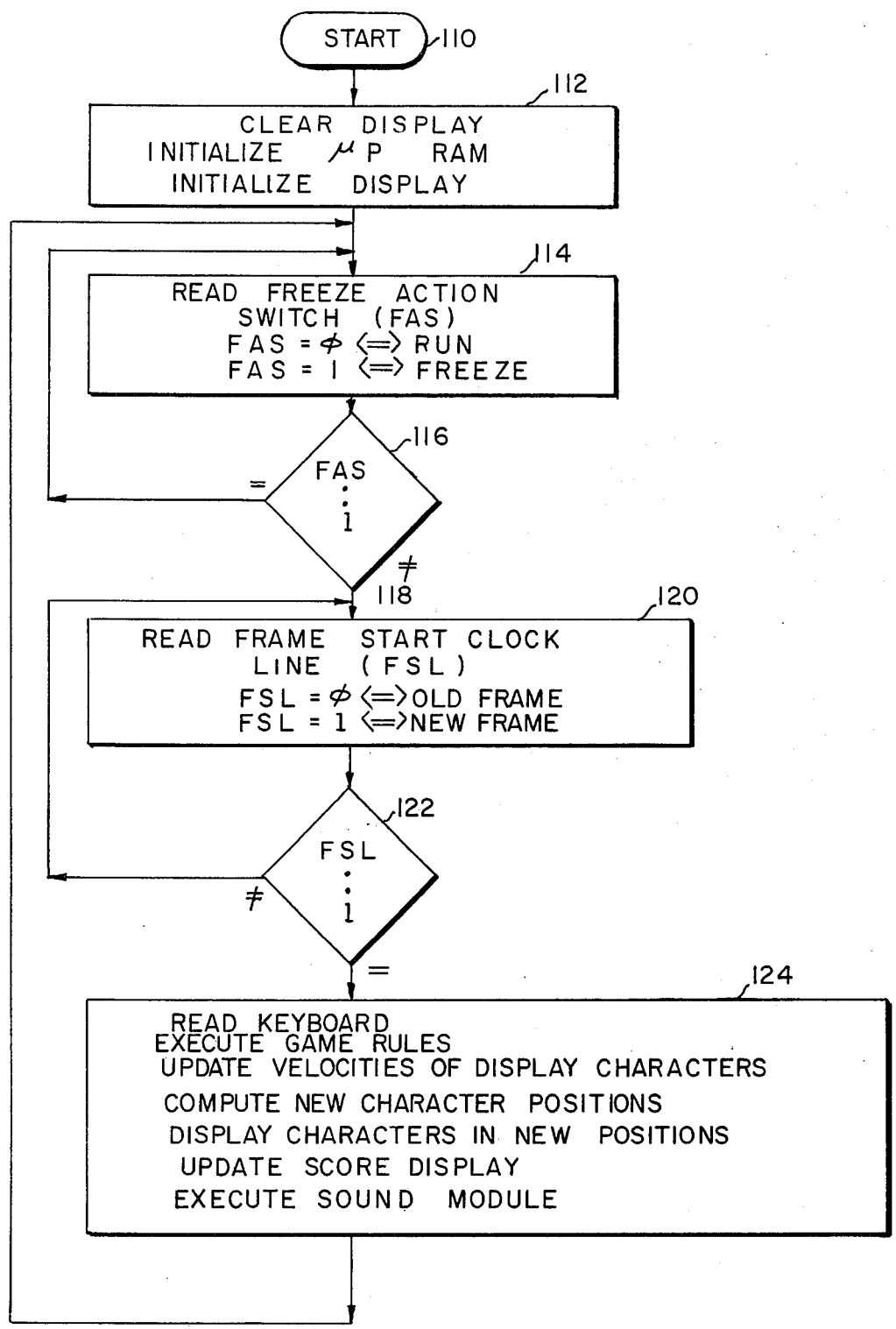
FIG. 6 is a flow chart depicting the method of providing freeze frame capability to the system of FIG. 1.

FIG. 6 illustrates the flow chart of a typical microprocessor-controlled video game wherein only freeze-frame capability is shown in detail. The program is stored in the ROM 14 of the microprocessor and initiated at step 110 thereof at the beginning of game play.

The first step 112 of the program causes the display (television screen) to be cleared and the microprocessor RAM and display to be initialized, that is, readying the RAM to begin game play and putting up on the display certain symbology such as backgrounds, messages, etc.

Step 114 of the program causes the microprocessor to read the freeze-action switch.

Step 116 requires a determination as to the status of the freeze-action switch; if FAS=0, indicating that freeze action is NOT called for, the execution of the algorithm game continues in normal fashion via line 118 of the program. The game is continued by executing the next frame to be displayed. Step 120 of the program reads the frame start clock which is part of the conventional game and if a new frame is ready for generation as determined by step 112, the game continues in normal fashion as indicated by step 124, i.e., step 124 is executed for each new frame at a rate of 60 times per second for games configured in accordance with U.S. television conventions.

If the execution of the game algorithm and the consequential data transfer to the TVI (18) is interrupted periodically by periodically setting FAS=1, then a slow motion display results because 2, 3, 4 . . . N frames might be repeated (replayed) during each interval when the data transfer has been stopped. Another switch is provided to initiate slow motion. Again, instead of a separate slow-motion switch (SMS) one of the keys of keyboard 30 may be employed for this purpose. Thus, to provide a slow-motion capability each frame is repeated N times resulting in displaying motion at 1/Nth that of real time.

Figure 7:
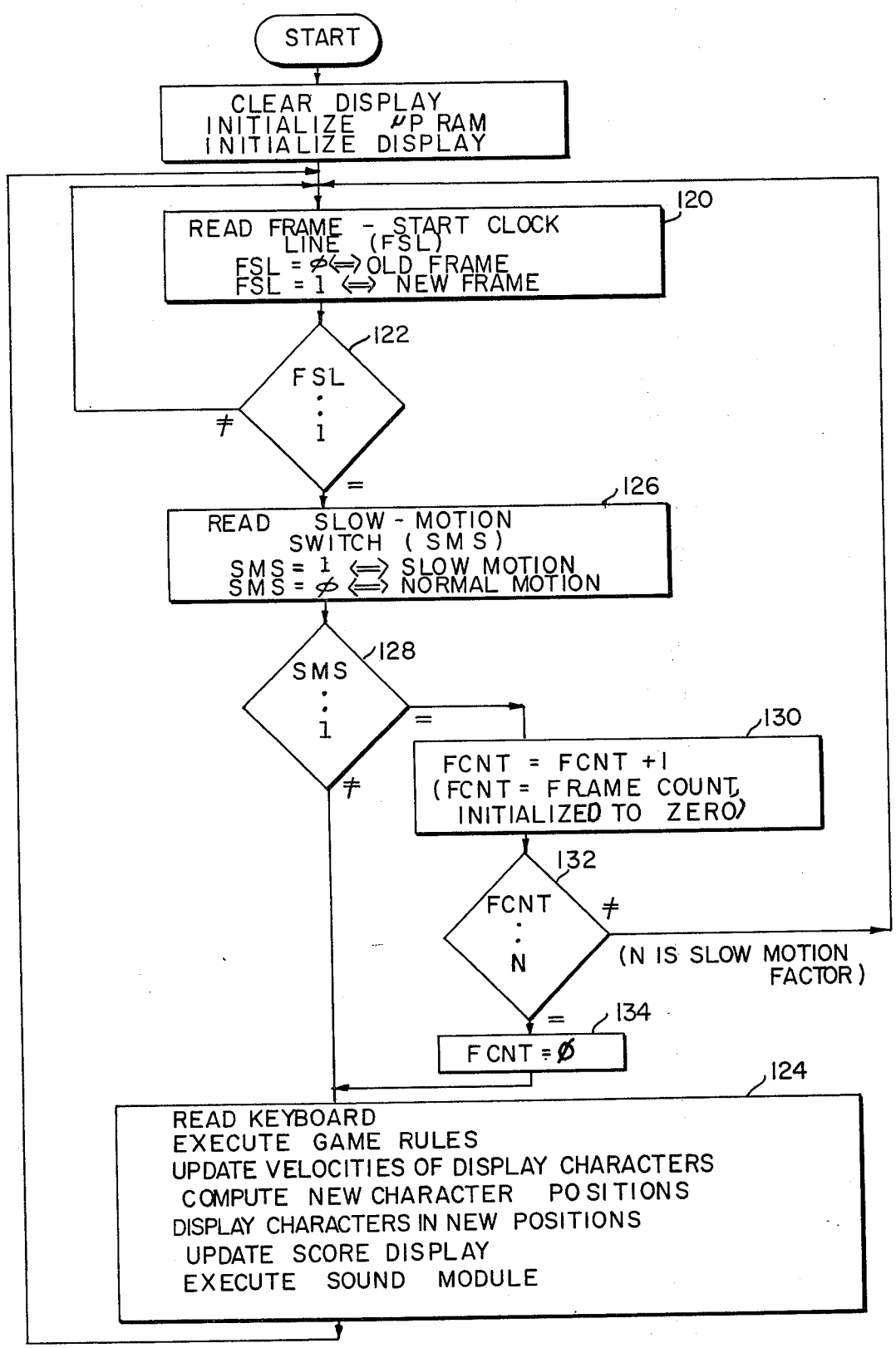
FIG. 7 is a flow chart depicting the method of providing slow motion capability to the system of FIG. 1.

The program for a game including slow-motion capability is shown in FIG. 7 wherein only the slow-motion capability is illustrated in detail. The steps of this program are like that of the program of FIG. 6 with the exception of steps 126, 128, 130, 132 and 134.

When the slow-motion switch has been read (step 126) and a determination made (step 128) that the switch is in the slow-motion mode, a frame counter is incremented (step 130). The frame counter is preferably located in RAM 16. The program then steps through steps 120, 121, 126, 128, 130 and 132 until the frame counter reaches N (the slow-motion factor at which time the frame counter is reset to zero (step 134) and the game then proceeds in normal fashion.

While specific programs have been described to illustrated ways of providing instant replay, freeze action and slow motion, it will be readily apparent to those skilled in the art that such capabilities can be provided by somewhat different program algorithms. Thus, it is to be understood that the embodiments shown are illustrative only, and that many variations and modifications may be made without departing from the principles of the invention, herein disclosed and defined by the appended claims.

We claim:

1. In a microprocessor-controlled video game including means for generating signals representing symbols for display on the screen of a cathode ray tube and manually actuatable controls providing responsive displayed motion of said symbols on said display, apparatus for providing an instant replay capability, comprising:

means for storing signals representing the positions of said controls at predetermined intervals for a predetermined period of time;

means for establishing predetermined intervals for a predetermined period of time; and means for outputting said stored signals to cause replay of that portion of a game previously executed during said predetermined period of time.

2. Apparatus as defined in claim 1 wherein said signal storing means includes a random access memory.

3. In a microprocessor-controlled video game including means for generating signals representing symbols for display on the screen of a cathode ray tube and manually actuatable controls providing responsive displayed motion of said symbols on said display, apparatus for providing an instant replay capability, comprising:

means for storing signals representing initial game parameters and the initial positions of said controls at one point in time;

means for storing signals representing subsequent different positions of said controls;

means for generating signals representing discrete intervals of time;

means for storing said time signals when said signals representing subsequent changed positions of said controls are generated; and means for outputting said stored control and time signals to cause an instant replay of a portion of a game.

4. Apparatus as defined in claim 3 wherein said storing means includes a random access memory.

5. Apparatus as defined in claim 3 wherein said storing means includes a serial shift register memory.

6. Apparatus as defined in claim 3 wherein said time signal generating means includes a divider and up counter.

7. Apparatus as defined in claim 1 or 3 wherein the microprocessor-controlled video game includes a television interface for providing properly formatted signals to the cathode ray tube, and further including means for providing a freeze-frame capability, comprising:

means for controlling the flow of data from the game microprocessor to the television interface; and means for interrupting the flow of data from the game microprocessor to the television interface such that the television interface will continually output the same signals to the cathode ray tube to cause the cathode ray tube to display the same frame at the system vertical frame rate.

8. Apparatus as defined in claim 1 or 3, wherein the microprocessor-controlled video game includes a television interface for providing properly formatted signals to the cathode ray tube, and further including means for providing a slow-motion capability, comprising:

means for flowing data from the game microprocessor to the television interface;

means for causing said television interface to output the same data N times for each frame of data to be displayed on the cathode ray tube screen where N is the factor by which game action is to be slowed.

9. A method of providing an instant replay capability to a microprocessor-controlled video game which includes means for generating signals representing symbols for display on the screen of a cathode ray tube and manually actuable controls providing responsive displayed motion of said symbols on said display, comprising the steps of:

storing signals representing the position of game controls at predetermined intervals for a predetermined period of time;

establishing predetermined intervals for a predetermined period of time; and outputting such stored signals to occasion replay of that portion of a game previously executed during said predetermined period of time.

10. The method of claim 9, further comprising the step of recalling said stored signals to provide instant replay.

11. A method of providing an instant replay capability to a microprocessor-controlled video game which includes means for generating signals representing symbols for display on the screen of a cathode ray tube and manually actuatable controls providing responsive displayed motion of said symbols on said display, comprising the steps of:

generating signals when player motion commands are entered;

generating signals representing the time when said player commands are entered; and storing said signals.

12. The method of claim 9 or 11 wherein the microprocessor controlled video game includes a television interface, further including providing a freeze-action capability, comprising the steps of:

determining that freeze-action mode is called for; and interrupting data flow from the microprocessor to the television interface so that the television interface will cause the same information to be repeated frame after frame until freeze-action mode is to be stopped.

13. The method of claim 9 or 11, further including providing slow-motion capability to a microprocessor-controlled video game, comprising the steps of:

determining that slow-motion mode is called for; and displaying each new frame of information N times where N is the degree to which game action is slowed.

* * * * *